(12) United States Patent
Davie et al.

(10) Patent No.: US 6,925,287 B2
(45) Date of Patent: Aug. 2, 2005

(54) SIGNALLING SYSTEM AND A TRANSPONDER FOR USE IN THE SYSTEM

(75) Inventors: Alan J. Davie, East Grinstead (GB); Ian A. Marsden, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 440 days.

(21) Appl. No.: 10/067,426

(22) Filed: Feb. 4, 2002

(65) Prior Publication Data

US 2002/0106988 A1 Aug. 8, 2002

(30) Foreign Application Priority Data

Feb. 6, 2001 (GB) ............................................. 0102882

(51) Int. Cl.[7] .......................... H04B 5/00; H04B 1/16; H04B 1/04; G08B 26/00; G08B 1/08
(52) U.S. Cl. .................. 455/41.1; 455/41.2; 455/343.1; 455/343.3; 455/127.5; 340/10.5; 340/505; 340/539.1
(58) Field of Search .......................... 340/539.1, 10.51, 340/10.41, 10.4, 505; 455/39, 41.1, 41.2, 41.3, 343.1, 343.2, 343.3, 343.4, 343.5, 343.6, 127.1, 127.5, 572, 574

(56) References Cited

U.S. PATENT DOCUMENTS

| | | | | |
|---|---|---|---|---|
| 4,114,151 A | * | 9/1978 | Denne et al. .................. 342/44 |
| 5,113,184 A | * | 5/1992 | Katayama ................. 340/10.51 |
| 5,235,326 A | * | 8/1993 | Beigel et al. ............. 340/10.41 |
| 5,532,686 A | * | 7/1996 | Urbas et al. ............. 340/10.51 |
| H1606 H | * | 11/1996 | Gelnovatch et al. ........ 340/505 |
| 5,790,946 A | | 8/1998 | Rotzoll ........................ 455/343 |
| 5,995,806 A | * | 11/1999 | Tsubouchi et al. ............ 455/39 |
| 6,049,292 A | * | 4/2000 | Einfeldt et al. ............ 340/10.4 |
| 6,259,362 B1 | * | 7/2001 | Lin ............................. 340/457 |
| 6,462,647 B1 | * | 10/2002 | Roz ........................... 340/10.1 |
| 6,724,312 B1 | * | 4/2004 | Barber et al. ............ 340/573.2 |
| 6,788,204 B1 | * | 9/2004 | Ianelli et al. ............. 340/572.1 |

FOREIGN PATENT DOCUMENTS

| | | |
|---|---|---|
| EP | 0299557 B1 | 1/1989 |
| GB | 2224183 A * | 4/1990 ........... H04B/17/00 |

OTHER PUBLICATIONS

Philips I–CODE Labeling System.

* cited by examiner

*Primary Examiner*—Vivian Chin
*Assistant Examiner*—Raymond B. Persino
(74) *Attorney, Agent, or Firm*—Kevin Simons

(57) ABSTRACT

A signalling system includes a plurality of active transponders (10), an interrogation station (12) and a source (14) of switching signals. Each of the transponders has a microcontroller (20), a radio transceiver (34) for responding to radio interrogation signals from the interrogation station, the radio transceiver being coupled to the controller by way of switching means (36) which switches the transceiver on or off whilst leaving the microcontroller active, and a passive receiver (38) for receiving switching signals from the source of switching signals which signals are used by the microcontroller for switching-on or -off the transceiver. Transducers (26, 28, 30) may be coupled to the microcontroller for monitoring environmental features, such as ambient temperature and humidity, and data relating to the features is stored in a RAM (32) in readiness to be relayed to storage means (56) in the interrogation station (12) as and when required. Signals received by the passive receiver enable the radio transceiver to be de-activated in locations, such as in an aircraft, where spurious radiation from the transponder is not permitted and to be re-activated when removed from such a location.

9 Claims, 1 Drawing Sheet

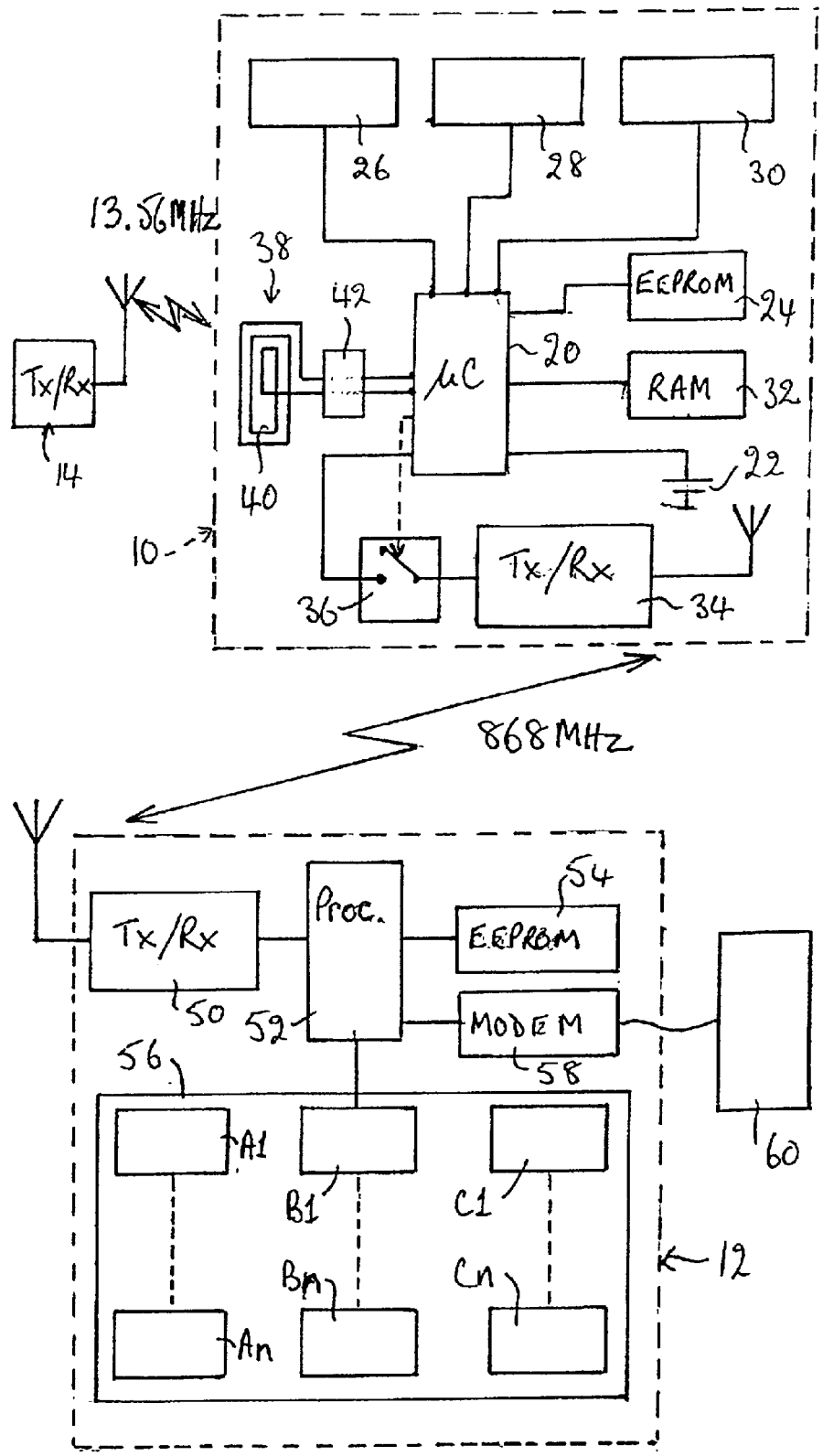

SIGNALLING SYSTEM AND A TRANSPONDER FOR USE IN THE SYSTEM

The present invention relates to a signalling system which includes transponding devices for transmitting response signals in reply to interrogating signals transmitted by an interrogation station. The term transponding in the present specification is intended to include not only a response signal being derived, by example, dividing or multiplying the interrogating frequency but also a response signal which is generated independently of the interrogating frequency.

Many such systems exist which serve various functions, one of the most popularly known being shoplifting detector systems in which tags containing radio transponders are attached to higher value articles and interrogating stations, located beyond a pay point, detect those tags which have not been removed in the purchasing transaction. In more intelligent systems the tags are able to transmit digitally coded signals which can be used to identify the location of persons on say an offshore oil rig or can be used to identify cattle, for example cows, in an animal feeding system in which say the amount of feed is related to the volume of milk produced.

A simpler, less expensive system is the Philips I•CODE labelling system in which the transponders comprise inexpensive, self adhesive, smart passive labels which can be used in security applications, parcel distribution, baggage sorting and collection systems, retail sales and distribution, library services and source tagging (counterfeit protection).

Depending on the system architecture, the transponders may be passive which is generally understood to mean that batteries are not included in the tags and power is derived from the interrogating signal or other external excitation field either directly or through the use of current storage devices such as capacitors or they may be active which is generally understood to mean that the tags include a battery, for example a lithium battery, for powering the transponding circuitry in the tag.

Although active tagging systems offer many performance advantages over their passive counterparts there are some circumstances when spurious, low levels of radiation from an active tag may be considered unacceptable. One case in point is the use of radio devices (either transmitters or active receivers) on board an aircraft. To be certain of meeting the strict regulations that govern these types of environment it may be necessary to implement an active tag with a true zero power standby mode. The problem with implementing this type of function is that it becomes rather difficult to re-activate the tag when the receiver has been placed into a completely disabled state because it cannot hear the "wake up" instruction.

EP-B1-0 299 557 discloses an identification system for stock farms in which an active transponder is connected to battery terminals only when the interrogation field has sufficient strength. For simple identification purposes such an arrangement is adequate and serves to extend the life of the battery.

However newer transponding signalling systems require the tag to be able to build-up a history of say the environment to which an article, such as a sealed parcel, has been subject during its handling, storage and transmission. This cannot be done if the transponding circuitry of an active tag is disabled by the battery being disconnected completely.

An object of the present invention is to eliminate or reduce significantly spurious radiation from the transponder circuitry of an active tag whilst allowing the tag to be activated when required.

According to one aspect of the present invention there is provided a signalling system comprising a transponder including a controller for controlling the operation of the transponder, a radio transceiver coupled to the controller by way of switching means, an electric current source coupled to the controller, and a radio signal receiving means coupled to the controller for providing signals for activating the switching means to inhibit or permit the operation of the radio transceiver, a transponder interrogation station for interrogating the transponder by way of signals transmitted to, and received from, the radio transceiver, and a source of switching signals receivable by the signal receiving means when in range.

According to a second aspect of the present invention there is provided a transponder for use in an interrogation system, the transponder including a controller for controlling the operation of the transponder, a radio transceiver coupled to the controller by way of switching means, an electric current source coupled to the controller, and a radio signal receiving means coupled to the controller for providing signals for activating the switching means to inhibit or permit the operation of the radio transceiver.

The present invention is based on the realisation that certain functions of a tag can be energised even when spurious radiation from the tag is not permitted, but the transceiving section can be re-activated by way of a signal transmitted to a passive receiver which is coupled to the controller.

If it is desired to monitor the environmental changes to which an article carrying a tag has been subjected, transducers, such as temperature and humidity sensors, are provided and coupled to the controller which stores the data acquired in a RAM even when the transceiving section has been deactivated. Once the tag has been re-activated then on interrogation, the stored data can be read-out. The turning-off and -on of the transceiving section by the radio signal receiving means is done in a positive manner so that passing a de-activated tag through a normal interrogation field will not enable it to be reactivated. The characteristics of the interrogation signal may be completely different from the switching signal thereby reducing significantly the risk of inadvertent operation by an undesired signal.

The radio signal receiving means may comprise a passive radio receiver which derives its power from the switching signals.

An embodiment of a signalling system in accordance with the present invention will now be described, by way of example, with reference to the single FIGURE of the accompanying drawing.

The illustrated embodiment comprises three main components a transponder tag 10, an interrogation station 12 and a switching signal station 14. Although a single tag 10 has been shown, in reality there will be a large plurality of tags in use.

The transponder tag 10 comprises a microcontroller 20 having connections to various off-chip devices. The microcontroller 20 and the off-chip devices are powered by a battery 22, for example a lithium cell. An EEPROM 24 stores the software and identification coding necessary for the operation of the microcontroller 20. A number of sensors or transducers 26, 28, 30 for monitoring the environment and handling of an article to which the tag 10 is attached are connected to the microcontroller 20. The sensors may include a temperature sensor 26, a humidity sensor 28 and anything else, for example an accelerometer to monitor heavy handling and/or dropping of the article. The data from these sensors is digitised by the microcontroller 20 and stored in a random access memory (RAM) 32.

A transceiver 34 is coupled to the microcontroller 20 by way of an electronic switch 36 controlled by the microcontroller 20. The transceiver 34 operates at a frequency of 868 MHz and receives interrogating signals from, and sends response signals to, the interrogation station 12. The interrogating signals may include an identification code and/or the response signals may be encoded. The illustrated system operates at a single frequency which has the advantage that the transceiver 34 can lock its frequency to that of the interrogating signal. However the transceiver 34 could transmit on a frequency derived from the interrogating signal, for example a harmonic or sub-harmonic, or transmit on a frequency unrelated to that of the interrogating signal.

A simple passive radio receiver 38, which may comprise a spiral antenna 40, is coupled to the microcontroller 20. The receiver 38 provides control signals relayed from the switching signal station 14, which signals are used by the microcontroller 20 for actuating the electronic switch 36. The switching signal station 14 operates at a frequency which is significantly different from that of the interrogating signal, for example 13.56 MHz. If desired the signals may be encoded using the Philips I•CODE which is a code used widely with passive tags. If so, an I•CODE chip 42 manufactured by Philips Semiconductors is coupled in the signal path between the antenna 40 and the microcontroller 20. Optionally the receiver 38 may comprise a transceiver which enables signals to be transmitted to the switching signal station 14 by way of the antenna 40.

The interrogation station 12 comprises a transceiver 50 which is coupled to a processor 52 which operates in accordance with software stored in an EEPROM 24. A large RAM 56 arranged as a plurality of storage areas A1 to An, B1 to Bn and C1 to Cn store environmental data relayed from respective transponder tags 10 for later recovery. A modem 58 interfaces the processor 52 with data links generally represented by the block 60.

In normal operation the transponder tag 10 is attached to an article, for example a parcel, to be shipped by a courier over an air link. Details of the addressee are stored together with the tag's own identity in the EEPROM 24. In the handling of the parcel it passes through a succession of interrogation stations 12. At each station the identity and destination are noted and used to facilitate the handling and routing of the article. Also any data sensed by the sensors 26, 28, 30 and stored in the RAM 32 is read-out in response to a request from the interrogation station and relayed by the transceiver 34 to the station 12 where it is stored at one of the plurality of storage areas A1 to An, B1 to Bn, C1 to Cn of the RAM 56. The reading-out of the data from the RAM 32 may be done destructively or alternatively the stored data may be overwritten by new data after it has been read-out and relayed to the interrogation station.

At an air freight terminal the article after being sorted is subject to a "switch-off" signal transmitted by a switching station 14 which causes the microcontroller to open the switch 36 disabling the transceiver 34 whilst leaving the remainder of the tag 10 active but not producing radiation of any significance. In this state the microcontroller 20 can still ensure that environmental data detected by the sensors 26, 28, 30 can be stored in the RAM 32 but is unable to respond to any interrogation signals from a station 12. The article can then be loaded onto an aircraft in the sure knowledge that the transceiver 34 has been muted.

At the destination air freight terminal the article is passed by a switching signal station 14 which transmits a "switch-on" signal which is detected by the passive receiver 38. The microcontroller 20 generates a signal closing the switch 36 thereby enabling the transceiver 34. Thereafter the tag 10 is able to respond to interrogating signals and to transfer any data stored in the RAM 32.

If desired data relating to a particular tag and stored at a number of interrogation stations 12 can be collated by one station in readiness to be read-out if a query arises over the environmental conditions to which the article had been exposed.

If the passive radio receiver 38 is adapted to transmit signals, such as I•CODE signals, it will be possible to extend the versatility of the tag 10 by enabling it to be woken-up to transmit its identity and then return to a sleep mode. Such a capability will enable parcels having a tag to be sorted as they are transported along conveyor belts and guided by deflectors into the appropriate bins. The final destination address can be stored at the switching station 14 and this information is used to actuate the deflectors.

In the present specification and claims the word "a" or "an" preceding an element does not exclude the presence of a plurality of such elements. Further, the word "comprising" does not exclude the presence of other elements or steps than those listed.

What is claimed is:

1. A signalling system comprising a transponder including a controller for controlling the operation of the transponder, an active radio transceiver coupled to the controller by way of switching means, an electric current source coupled to the controller, and a passive radio signal receiving means coupled to the controller for providing signals for activating the switching means to inhibit or permit the operation of the radio transceiver, a transponder interrogation station for interrogating the transponder by way of signals transmitted to, and received from, the active radio transceiver, and a source of switching signals receivable by the passive signal receiving means when in range; and wherein the controller receives current from the electric current source without regard to whether the passive radio signal receiving means is in range.

2. A system as claimed in claim 1, characterised in that the transponder further comprises at least one transducer coupled to the controller and a random access memory for storing data representative of information produced by the transponder, wherein the at least one transducer is selected from the group consisting of a temperature sensor, a humidity sensor, and an accelerometer.

3. A system as claimed in claim 2, characterised in that the transponder interrogation station has storage means for storing said data relayed by the transponder in response to an interrogation signal.

4. A system as claimed in claim 1, characterised in that the source of switching signals comprises a radio transmitter for communicating with the passive radio receiver.

5. A system as claimed in claim 4, characterized in that the transponder interrogation station and the source of switching signals operate at different frequencies.

6. A system as claimed in claim 1, characterized in that the transponder interrogation station and the source of switching signals operate at different frequencies.

7. A transponder for use in an interrogation system, the transponder including a controller for controlling the operation of the transponder, an active radio transceiver coupled to the controller by way of switching means, an electric current source coupled to the controller, and a passive radio signal receiving means coupled to the controller for providing signals for activating the switching means to inhibit or permit the operation of the active radio transceiver; and wherein the controller receives current from the electric current source without regard to whether the passive signal receiving means is in range.

8. A transponder as claimed in claim 7, characterised in that the transponder further comprises at least one transducer coupled to the controller; and a random access memory for storing data representative of information produced by the transponder, wherein the at least one transducer is selected from the group consisting of a temperature sensor, a humidity sensor, and an accelerometer.

9. A transponder as claimed in claim 8, characterised in that the transponder interrogation station has storage means for storing said data relayed by the transponder in response to an interrogation signal.

* * * * *